UNITED STATES PATENT OFFICE.

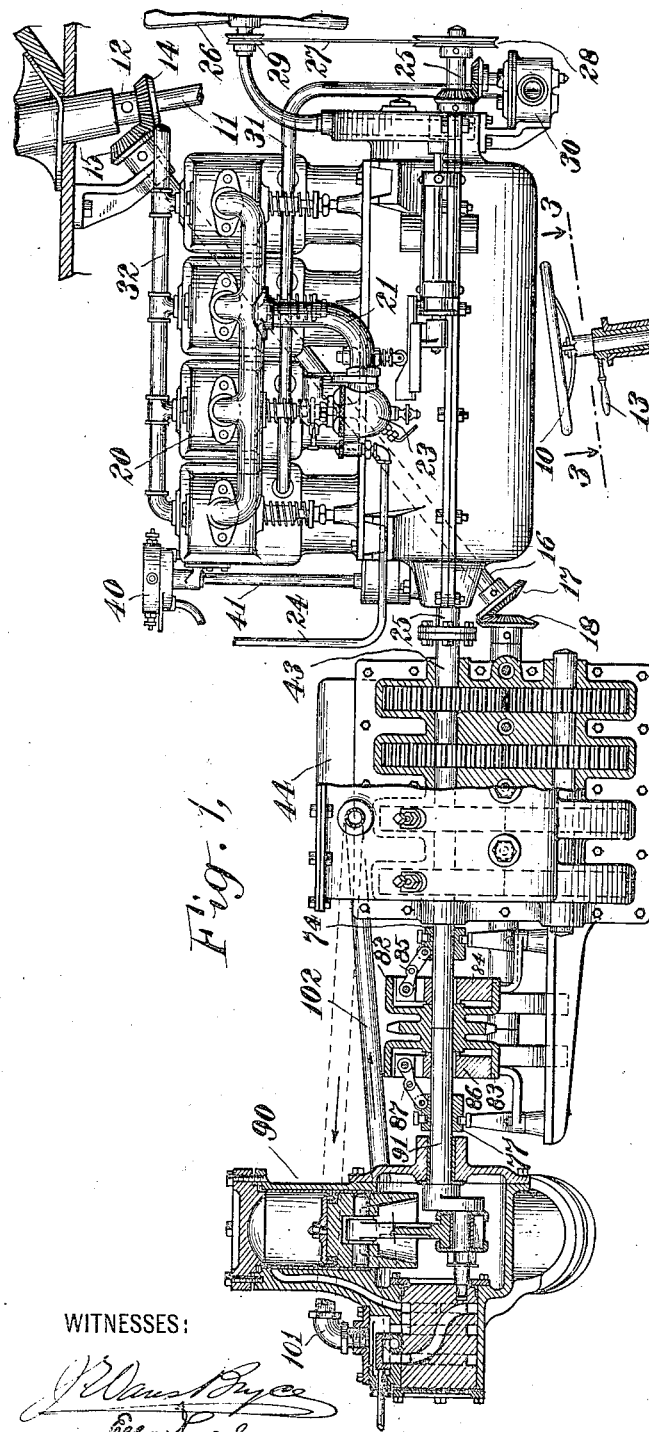

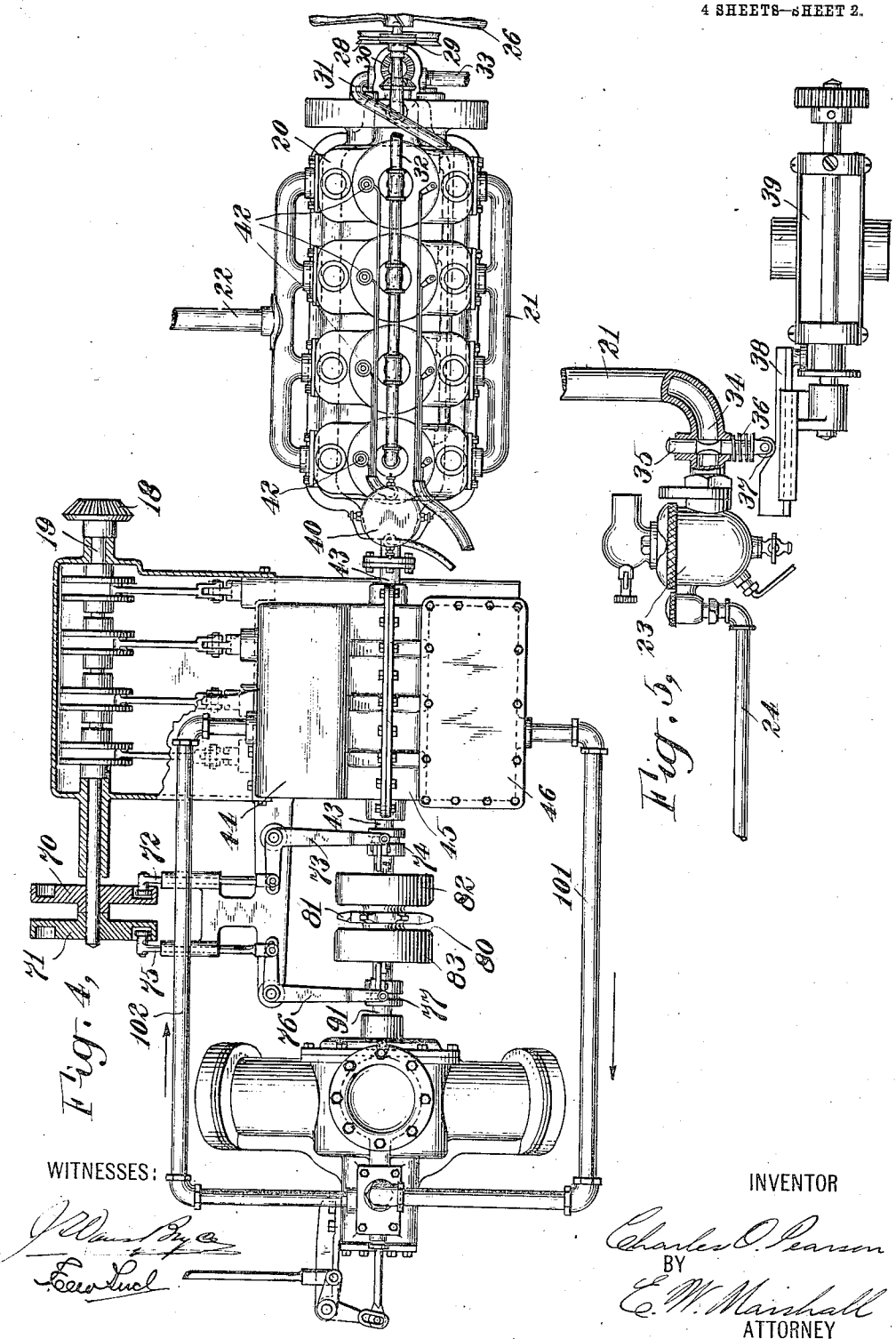

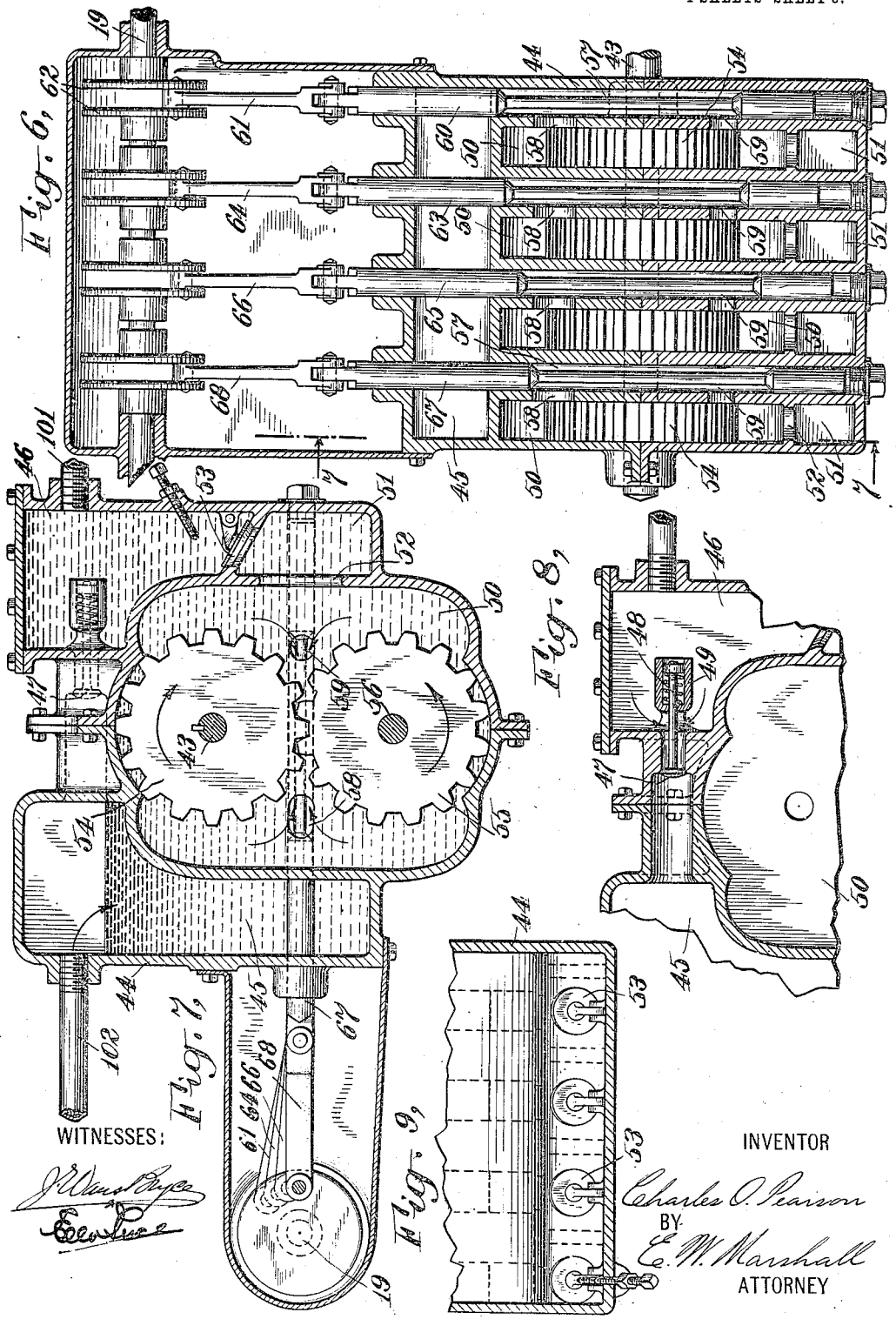

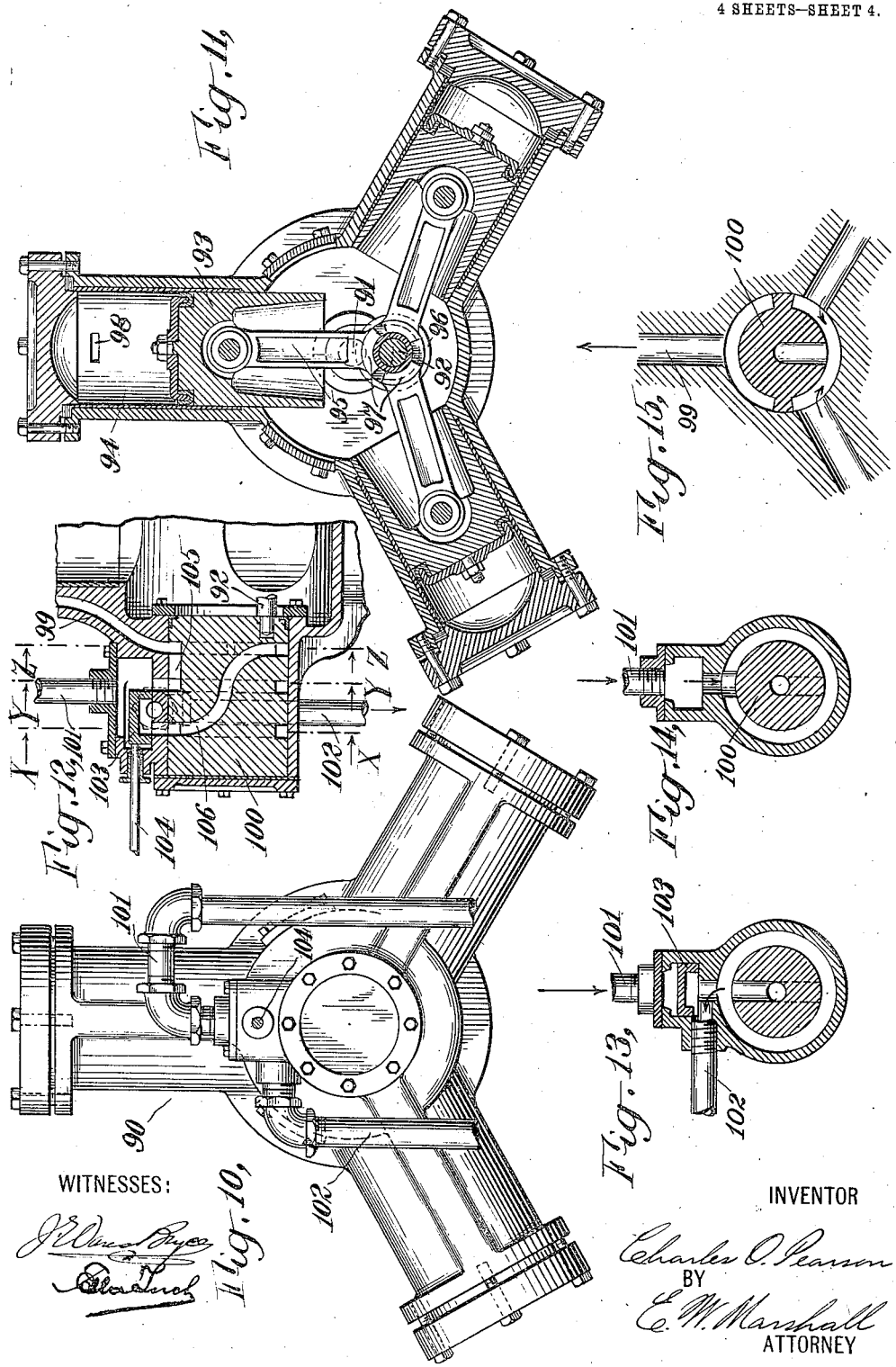

CHARLES O. PEARSON, OF NEW YORK, N. Y.

POWER-TRANSMISSION SYSTEM.

1,055,554.  Specification of Letters Patent.  Patented Mar. 11, 1913.

Application filed October 8, 1908. Serial No. 456,699.

*To all whom it may concern:*

Be it known that I, CHARLES O. PEARSON, a citizen of the United States, and a resident of the borough of Brooklyn, in the county of Kings, city and State of New York, United States of America, have invented certain new and useful Improvements in Power-Transmission Systems, of which the following is a specification.

My invention relates to a power transmission mechanism whereby the power generated by a prime mover may be transmitted to a driven member at desired speeds, or in opposite directions in a simple and efficient manner.

By means of my invention the motor or prime mover may have a rotation in one direction at a substantially constant rate of speed, and the driven member may be connected therewith in such a way that it may be driven in either direction and its rate of rotation varied at will, and manually controlled to a great nicety.

It is also arranged to furnish a maximum driving pressure when the driven member is rotated at slow speeds.

This and further objects of my invention will appear in the following specification in which I will describe the construction and operation of certain apparatus which I have chosen as an illustration of my invention, and the novel features of which will be set forth in the appended claims.

The present invention is an improvement or a modification of the invention disclosed in a pending application for patent Serial Number 452,756, filed by me September 12, 1908.

Referring to the drawings, Figure 1 is a side elevation of a gasolene motor together with a connected pumping apparatus and associated liquid or fluid motor mechanism and a part of the controlling device, which are shown combined in a novel manner. Some of the parts in this figure are in section to more clearly show their construction. Fig. 2 is a sectional side elevation of a steering wheel and a speed control lever, and Fig. 3 is a sectional plan view of some of these parts, the section being taken on the line 3—3 of Fig. 2. In Fig. 4 the parts shown in Fig. 1 are shown in plan view, partly in section. Fig. 5 is a side elevation of a carbureter with its throttle valve shown in section, together with a centrifugal governor mechanism for automatically controlling the throttle valve. Fig. 6 is a sectional plan view on a larger scale of the pumping apparatus and its controlling device. The same parts are shown in a sectional end elevation in Fig. 7, the section being taken on the line 7—7 of Fig. 6. Figs. 8 and 9 are sectional views of details of the pumping apparatus being, respectively, an end elevation of a relief valve and a plan view of the check valves. Fig. 10 is an end elevation, and Fig. 11 is a sectional end elevation of a fluid pressure motor which I use in transmitting the power of the prime mover to the driving member. Fig. 12 is a sectional side elevation of the controlling and reversing valves of this motor with their ports connected in one of their operative manners. In Figs. 13, 14 and 15 three sectional end elevations of the valves are shown, the sections being taken, respectively, on the lines X—X, Y—Y, and Z—Z of Fig. 12.

Like characters of reference designate corresponding parts in all of the figures.

10 designates the steering wheel of a truck to which this invention may be applied in the manner described somewhat specifically in the patent application to which reference has been made. This wheel is upon the upper end of a shaft 11 through which it may be connected in the usual manner with the steering gear of the truck.

12 is sleeve surrounding the shaft 11 and independently rotatable thereon. At its upper end and associated with the steering wheel is a speed control lever 13. On the lower end of this sleeve is a bevel gear 14 in mesh with a similar gear 15 upon a shaft 16. A bevel gear 17, affixed to the end of shaft 16, is in mesh with another gear 18 on the end of a controller shaft 19.

By means of the mechanism above described the pumping apparatus may be regulated and the speed of the driven member controlled in a manner which I will describe more specifically hereinafter.

20 designates a prime mover which, in this case, is shown as a four-cylinder four-cycle gasolene engine. Other types of engines or other forms of prime movers may be used instead if desired.

21 is the inlet or supply pipe of the prime mover, and 22 is its exhaust which may be led through a muffler in the usual manner.

23 is a carbureter which is supplied from the gasolene tank through a pipe 24.

26 is a fan driven by a belt 27 running over a grooved pulley 28 on the engine shaft, and a similar pulley 29 on the shaft of the fan. This will create an air circulation about the engine for the purpose of preventing overheating of its parts. In addition to this, the engine may be provided with a water-jacket and a circular pump 30.

31 is a pipe leading from the pump to the water-jacket, and 32 is a discharge pipe from the water-jacket to the usual cooling radiator which is connected by a pipe 33 back to the intake of the pump.

34 is a throttle valve for regulating the speed of the engine. This comprises a plunger 35, cut away as shown in the drawings, opposite the port which it controls, and pressed downward into open position by compression spring 36. On the lower end of plunger 35 is an antifriction roller 37 which rests upon a slidable cam member 38.

39 is a centrifugal governor which is arranged to be driven by the engine shaft by means of gears. The governor is so arranged that when the engine tends to exceed its normal speed it will automatically move the slidable cam 38 forward to close or partly close the throttle valve and to thereby maintain the engine at a practically constant rate of speed.

At 40 a spark timer or ignition circuit controller is shown. This is driven by the engine shaft through a vertical shaft 41, and it may be connected with a battery and with the spark plugs 42 of the engine in the usual manner.

43 is the pump actuating shaft which is directly coupled with and is a continuation of the engine shaft 25.

44 is a casing which surrounds the pumping apparatus and supports certain parts thereof. This casing is divided up into a plurality of chambers. One of these, designated in the drawings by 45, serves as a reservoir for the supply of oil or other suitable fluid. I prefer to use a light lubricating oil as this will work smoothly as a driving fluid and will keep the parts lubricated and free from wear. Another chamber 46 forms a pressure tank. Between the reservoir and the pressure tank a relief valve 47 is provided. This valve has extending from it a spindle 48, and a compression spring 49, pressing against a collar on the end of the spindle, which holds the valve closed until the pressure in the pressure tank 46 exceeds the desired amount, at which time it will automatically open. The end of spindle 48 may be threaded to provide adjustment for the collar and, consequently, for the relief valve.

The central portion of the casing is divided up into a plurality of chambers 50 intermediate the reservoir and the pressure tank. Each of these chambers communicates with an auxiliary chamber 51 through openings 52. Between each of the auxiliary chambers 51 and the pressure tank 46 is a check valve 53.

Within each of the chambers 50 and fitting closely against the sides thereof is a gear 54 which is keyed to the shaft 43. A similar gear 55 is provided within each of the chambers 50. These gears are loosely mounted upon a shaft 56, and are in mesh with the gears 54. All of the gears 54, 55 are arranged to fit closely against the sides of their respective chambers and against the top and bottom of the casing which is designed to conform with a portion of the peripheries of these gears.

At one side of each of the chambers 50 a passage 57 is provided. 58 designates ports from this passage into the left-hand side of the chambers 50 as viewed in Fig. 7. 59 designates similar ports from the right-hand side of the chambers 50 into the passages 57.

60 designates a piston valve controlling that passage 57 and its ports which communicate with the right-hand chamber 50 as seen in Fig. 6, or that which is nearest the engine 20. It is connected by a rod 61 with a pair of disks 62 by means of which it is eccentrically connected with the controller shaft 19. 63, 65 and 67 are similar piston valves controlling the passages and ports to the other gear chambers and connected, respectively by rods 64, 66 and 68 with the controlling shaft 19 by means of similar disks to those before pointed out, which, with the connecting pins which pass through the connecting rods, form a continuation of this controlling shaft. The piston valves and their connections are set at different relative positions as may be seen from the drawings.

Before proceeding with the description of the other parts of the apparatus I will point out the operation of this pumping apparatus.

The shaft 43 is arranged to be rotated by the engine 20 at a practically constant rate of speed. The gears 54 and 55 will be forced in the directions indicated by the arrows in Fig. 7. The result will be that the oil or other fluid which surrounds these gears will be circulated from the left-hand side of the chambers 50 to the right-hand side, over the tops of gears 54 and under the bottoms of gears 55, and back through ports 59, passages 57 and ports 58. Now, if an operator turns the controller shaft 19 by means of the mechanism previously described, the piston valve 60 will open a connection between the reservoir 45 and the first of the chambers 50 through its passage 57 and its port 58. The piston valve will, at the same time, close the port 59 from this first chamber. These operations will take place gradually and as rapidly or slowly as the operator desires. The effect will be to close the by-pass from that part of the chamber 50 which is on one side of the gears to the part which is on the other side of the gears so that the fluid forced over by the gears will pass out through its only outlet, that through the check valve 53, into the pressure tank 46.

When the first port 59 has been fully closed so that the pump in this right-hand chamber is working at its full capacity, a further movement of the controller shaft 19 will cause the piston valve 63 to begin to open the passage from the reservoir into the second chamber 50 and to close its port 59. This passage will be fully opened and the port fully closed when the piston valve 63 has had sufficient movement. In this same manner piston valves 65 and 67 may be moved to open connections between the reservoir and their respective chambers, and to close their respective by-passes. When all of these piston valves are open it may be seen that the reservoir 45 is directly connected with the left-hand side of all of the chambers 50, and that the liquid therefrom is being forced by the gears through the auxiliary chambers 51 and the check valves 53 into the pressure tank at the full capacity of all of the pumps.

I have shown and described four units to this pumping apparatus as this is a convenient number, but, of course, a smaller or a larger number of them may be employed if desired.

On the rear end of the controlling shaft 19 a number of slotted cam members 70 and 71 are affixed.

72 is a vertically slidable rod, the upper end of which is provided with an antifriction roller arranged to be engaged by the slotted portion of the cam member 70. The other end of this rod 72 is connected with a bell-crank lever 73. The lower end of this bell-crank lever is in engagement with a slidable collar 74 and is arranged to actuate it and a clutch which it controls. 75 is a similar vertically slidable rod, the upper end of which is provided with an antifriction roller engaging with the slot in the cam member 71. This rod 75 is connected with a bell-crank lever 76, the lower end of which is connected with a slidable collar 77. The cams are so placed that the driving member may be connected with the pump actuating shaft 43, or disconnected from this shaft and connected with a motor shaft 91.

80 designates the driven member which is mounted upon the pump actuating shaft 43 and the motor shaft 91. The central portion of this driven member is constructed in the form of a sprocket-wheel 81, which may be connected with any desired driven mechanism by means of a sprocket-chain. The forward and rear parts of the driving member are constructed to form housings 82 and 83, respectively. 84 is a clutch member connected to the shaft 43 and arranged to be brought into engagement with the housing 82 by means of the slidable collar 74 upon the shaft 43 and connecting mechanism 85 to lock the pump actuating shaft and the driven member 80 together. 86 is a similar clutch member keyed to the motor shaft 91 and arranged to be brought into engagement with the housing 83 by the slidable collar 77 to lock the motor shaft and the driving member together.

The motor 90 comprises three cylinders radially disposed about the axis of its shaft 91 and set 120° apart. These cylinders and their associated parts are similar so that but one of them need be described. The shaft 91 is constructed to form a crank from which a crank-pin 92 projects.

93 is a piston within a cylinder 94 and is connected with the pin 92 by means of a connecting rod 95.

96 is a collar surrounding the ends of this and the other piston rods and preventing them from being pulled away from the pin 92 by back-pressure. The end of the connecting rod 95, which is in engagement with the crank-pin 92, and the ends of the other connecting rods are enlarged as shown in the drawings at 97 for the above purpose.

98 is a port leading from the head of the cylinder to the controlling valve through a passage 99. The crank-pin 92 is extended into a rotary controlling valve member 100 which controls the connections between a pressure supply pipe 101 and an exhaust return pipe 102 to and from all three of the cylinders. The pressure supply pipe 101 is connected with the pressure tank 46, and the exhaust pipe 102 is connected with the reservoir 45.

When the parts are in the positions shown in Figs. 11 and 12, fluid pressure is being led into the top of the upper cylinder 94 and out from both of the two lower cylinders. This will cause the piston within cylinder 94 to be moved downward until it reaches the lower end of its stroke. At this point the rotary valve will be moved into such a position as to connect the port 98 with the exhaust, and that of one of the other cylinders with the supply pipe. This controlling valve and its ports are not arranged to allow for expansion as the device as shown is designed to be run with a non-expansible liquid such as oil. The changes necessary to adapt this motor to be driven by compressed air or other expansible fluid may readily be made by anyone skilled in the art.

103 is a slide valve which is arranged to reverse the connections of the supply and exhaust pipes relative to the various ports to which they are connected by the rotary valve 100. This may be done by means of a valve rod 104 which may be controlled manually. From Fig. 12 the manner in which this reverse is accomplished may be seen. When the parts are in the positions here shown, the inlet pipe is connected with a port designated by 105 and the passage 99, while the port 106 is connected with the exhaust pipe 102, but if the slide valve 103 is pushed over to the right, as far as it will go, it may be seen that this relation is now reversed and that the port 105 and the passage 99 will now be connected with the exhaust pipe 102 while the port 106 is connected with the supply pipe 101.

The above described arrangement of cylinders and valves is chosen for the purpose of illustrating the manner of carrying out my invention, for by it there will be no dead center and there will always be a thrust upon the crank-pin 92 at all parts of its travel so that a nearly uniform torque upon motor shaft 91 may be attained even when the latter is being driven at a slow speed.

When the engine is started the controlling shaft 19 is in such a position that the by-passes to all of the pumps are open so that they will circulate the fluid within their respective chambers without affecting the liquid in the reservoir or that in the pressure tank. The engine may be easily started as it only has to overcome the friction of the parts. By moving the speed control lever 13 a small amount, the gears in the right-hand chamber 50 will pump a small amount of the liquid into the pressure tank at a comparatively low pressure as some of it will continue to go through its by-pass. When the speed control lever is moved enough to entirely shut off this by-pass the first of the pumps will operate at its full capacity and will furnish a pressure limited only by the efficiency of the pump and the power of the engine. A heavy load may therefore be driven by it at slow speed. In the manner previously described, the rest of the pumps may be consecutively put into operation to drive the load at higher speeds, but at lower pressures as the single engine actuates all of the pumps. Consequently one, two, three, or all of the pumps may be actuated at will according to the load to be driven, and a speed attained as high as the power developed by the engine will allow.

The pressure tank 46 is always connected through supply pipe 101 with the motor 90 so that the amount of liquid which is pumped will be forced into the cylinders of the motor at different rates and under different pressures to cause the latter to drive the shaft 91 and through it, the driving member 80 which is connected with it by means of the clutch member 86.

By the arrangement above described the driving member 80 may be rotated at variable speeds up to that corresponding with the full capacity of any or all of the pumps. No matter how slowly the truck or other mechanism is driven, the torque transmitted by the driving member will be of such a quantity as to utilize practically the full power of the engine for driving the load. Thus, in climbing hills, a load limited only by the maximum pressure developed by one of the pressure pumps driven alone by the engine, may be driven.

The speed at which the truck or other mechanism is driven may be increased at will by the simple manipulation of the lever 13 which will adjust the pumping apparatus in the manner described and cause it to deliver a greater quantity of the pumped fluid to the motor 90. The maximum speed of the motor 90 may be approximately equal to that of the engine 20 so that when the operating or controlling shaft has been moved over to such a position as to cause all of the pumps to be in full operation, thereby giving full speed to the motor 90, the motor shaft 91 and the engine shaft 25 will move in unison. When these conditions are obtained the cam members are arranged to disconnect the driving member 80 from the motor shaft 91 and to lock it directly to the pump controlling shaft 43 which is directly connected with and is a continuation of the engine shaft 25. This locking operation is performed by means of the clutch member 84 being brought into engagement with the housing 82 through the mechanism which has been previously described.

The cams are so constructed that they are actuated only when the two shafts are running at practically the same rate of speed; consequently they are not subjected to the wear which the usual speed-changing clutches undergo on account of the slippage which is necessarily present. Obviously, the operator should not actuate these clutches when the motor shaft is running in a reverse direction to that of the engine shaft, and, if desired, the parts may be so arranged that he cannot operate them when the reverse valve has been shifted to cause the motor 90 to run backward.

Further movement of the controlling shaft 19 will move the piston valves which it controls back again until all of the by-passes are open. The pumps, then, will freely circulate the fluid which they control and the pumping apparatus will not longer require any of the power of the engine, other than the slight amount necessary to overcome the friction of its moving parts.

All of the operations above described may, of course, be reversed and may all take place while the parts are in motion. The engine is arranged to run at a practically constant rate of speed automatically maintained by the governor regardless of the load which is put upon it. Consequently the gasolene adjustment may be made to give the best efficiency, and this will insure freedom from the smoke and noxious gases emitted from engines of this type which do not burn their gases completely when their speed is varied in the manners heretofore necessary in varying the speed of the mechanism which they drive. The governor controls the amount of power developed by the engine and makes it proportional to the work put upon it. The speed at which the driven mechanism is driven by the engine is controlled by the manually actuated arrangement described.

Full power of the engine running at its most efficient speed is always available for driving the driven member at any speed up to the full power capacity of the engine. When this invention is applied to an automobile, the motor 90 may be used as a brake in descending hills and the speed of the automobile perfectly controlled under these conditions. Whenever the action of gravity tends to drive the motor faster than the fluid supply is admitted to its cylinders, there will be a back-pressure upon its pistons which will be counteracted by the ring 96. This back-pressure upon the motor pistons may be balanced by the amount of pressure admitted by the manual speed control mechanism, so that the speed of the driven member may be controlled to a great nicety from zero up to the speed at which the engine is able to drive any given load.

What I claim is:—

1. A prime mover arranged to run in one direction and at a substantially constant rate of speed, a pumping apparatus connected therewith comprising a plurality of rotary pumps, each of said pumps being provided with a by-pass and a balanced controlling valve, and a manually operated device for moving said valves together to cause the pumps to operate consecutively.

2. A prime mover arranged to run in one direction and at a substantially constant rate of speed, a pumping apparatus connected therewith comprising a plurality of rotary pumps, each of said pumps being provided with a by-pass and a balanced controlling valve, manual means for moving said valves together to cause the pumps to operate consecutively, and a member arranged to be driven by said pumping apparatus in either direction under different pressures and at different rates of speed.

3. A prime mover, a plurality of pumps each comprising a pair of intermeshing gears, one gear of each member being directly connected with the prime mover, a separate balanced by-pass valve for each pump, and a manually operated shaft for moving said valves and causing them to be closed consecutively.

4. A prime mover arranged to run at a substantially constant rate of speed, a plurality of pumps each comprising a pair of intermeshing gears within a chamber, one gear of each pair being directly connected with the prime mover, a separate balanced by-pass valve for each pump, a manually operated shaft for moving said valves and causing them to be closed consecutively, and a member arranged to be driven by said pumps under different pressures at different rates of speed.

5. A prime mover arranged to run at a substantially constant rate of speed, a plurality of pumps each comprising a pair of intermeshing gears, one gear of each pair being directly connected with the prime mover, an oil-tight casing inclosing said pumps and arranged to form a reservoir, a pressure tank, and a plurality of intermediate chambers inclosing said gears; a by-pass valve for each pump, a fluid supply, a fluid pressure motor arranged to be driven by the fluid supply, and a manually operated device for controlling said by-pass valves so that the fluid may be delivered to the motor from one or more of the pumps at variable rates and under oppositely varying pressures.

6. A prime mover having a shaft arranged to run in one direction at a substantially constant rate of speed, a plurality of pumps each comprising a pair of intermeshing gears, one gear of each pair being directly connected with the shaft of the prime mover, an oil-tight casing inclosing said pumps and arranged to form a reservoir, a pressure tank, and a plurality of intermediate chambers inclosing the intermeshing gears, a relief valve between the pressure tank and the reservoir, a balanced by-pass valve for each pump, a fluid supply, a fluid pressure motor arranged to be driven in either direction by said fluid supply, a manually operated device for controlling the by-pass valves so that the fluid may be delivered to the motor from one or more of the pumps at variable rates and under oppositely varying pressures to thereby vary the speed of the motor, and means for reversing the direction of rotation of the motor.

7. A prime mover, a rotary pumping apparatus directly connected therewith and arranged to be driven in one direction, means for automatically maintaining the speed of the prime mover and the pumping apparatus at a substantially constant rate, a fluid supply, a reversible fluid pressure motor driven by said fluid supply in either direction under different pressures and at different rates of speed, a plurality of balanced valves, a manually operated device for moving said valves to control the delivery of said pumping apparatus so that the fluid may be delivered to the motor at different rates to thereby vary the speed of the motor from a minimum to a maximum or from a maximum to a minimum in a series of steps, and manual means for reversing the direction of rotation of said motor.

8. A prime mover arranged to run at a substantially constant rate of speed, a rotary pumping apparatus directly connected therewith, a fluid pressure motor driven by the pumping apparatus, means for regulating the pumping apparatus while running to thereby vary the speed of the motor from a minimum to that of the prime mover, a driven member, means for connecting the driven member to the motor and for disconnecting it therefrom and connecting it with the prime mover only when the speed of the motor is brought up to substantially that of the prime mover.

9. A prime mover having a shaft arranged to rotate at a substantially constant rate of speed, a pumping apparatus comprising a pair of intermeshing gears, one of said gears being directly connected with said prime mover shaft, a fluid pressure motor driven under different pressures by the pumping apparatus, said motor having a shaft, means for regulating the pumping apparatus to vary the speed of the motor shaft, a driven member, means for connecting the driven member with the motor shaft and for disconnecting it therefrom and connecting it with the prime mover shaft only when the speed of the motor shaft is brought up to substantially that of the prime mover shaft.

10. A prime mover having a shaft arranged to rotate at a substantially constant rate of speed, a pumping apparatus comprising a pair of intermeshing gears, one of said gears being directly connected with said prime mover shaft, a fluid pressure motor having a shaft in alinement with the shaft of the prime mover, said motor being driven by the pumping apparatus, a by-pass valve for regulating the pumping apparatus to thereby vary the speed of the motor from a minimum to that of the prime mover in a plurality of steps, a driven member loosely mounted upon both of said shafts, means for connecting and disconnecting said driven member with and from either of said shafts, and means for changing said connection when said shafts are running at substantially the same rate of speed.

11. A prime mover arranged to run at a substantially constant rate of speed, a fluid supply, a pumping apparatus arranged to circulate the fluid, said pumping apparatus comprising a plurality of pairs of intermeshing gears, one gear of each member being directly connected with the prime mover, a motor driven by the circulation of said fluid under different pressures and at different speeds, a mechanism driven by the motor when said motor is running at slower speeds than that of the prime mover, by-pass valves for regulating the pumping apparatus to vary the pressure and the rate of circulation of the fluid to thereby vary the speed of the motor, a clutch mechanism for directly connecting the driven mechanism with the prime mover when the speed of the driven mechanism reaches that of the prime mover, and manual means for actuating the by-pass valves and the clutch mechanism.

12. A prime mover having a shaft arranged to run at a substantially constant rate of speed, a fluid supply, said pumping apparatus arranged to circulate the fluid, said pumping apparatus comprising a plurality of pairs of intermeshing gears, one gear of each pair being directly connected with the prime mover shaft, a motor driven by the circulation of said fluid, said motor having a shaft arranged to be driven under different pressures and at different speeds, a mechanism driven by the motor when said motor is running at slower speeds than that of the prime mover shaft, by-pass valves for regulating the pumping apparatus to vary the pressure and the rate of circulation of the fluid to thereby vary the speed of the motor shaft, a clutch mechanism for connecting the driven member with the prime mover shaft when the speed of the driven member reaches that of the prime mover, said by-pass valves being arranged to stop the circulation of the fluid through the motor after the driven mechanism has been connected with the prime mover shaft, and manual means for actuating the controlling device and the clutch mechanism.

13. An internal combustion engine having a shaft arranged to rotate at a substantially constant rate of speed, a rotary pump comprising a pair of gears, one of said gears being directly connected with the engine shaft, a fluid pressure motor comprising a shaft and a plurality of radially disposed cylinders arranged to produce a driving torque throughout all parts of each of its revolutions, said motor being arranged to be driven by the pump, means for regulating the pump while running to vary the speed of the motor, a driven member, a clutch arranged to connect and disconnect said member to and from the motor shaft, a clutch arranged to connect and disconnect said mechanism to and from the engine shaft, and means for actuating said clutches only when said shafts are running at substantially the same rate of speed.

14. An internal combustion engine having a shaft arranged to rotate at a substantially constant rate of speed, a rotary pump comprising a plurality of pairs of gears, one of said gears of each pair being directly connected with the engine shaft, a by-pass for each pair of gears, and a balanced controlling valve for each by-pass; a fluid pressure motor comprising a shaft and a plurality of radially disposed cylinders, said motor being arranged to be driven by the pump, a driven member, a clutch arranged to connect and disconnect said member to and from the motor shaft, a clutch arranged to connect and disconnect said mechanism to and from the engine shaft, and a manually operated device for moving said valves to control the delivery of the pump and for controlling said clutches when the shafts are running at substantially the same rate of speed.

15. The combination with a prime mover, of pumping mechanism, a fluid motor, mechanism connected to the motor to be driven thereby, means for conveying fluid between the pumping mechanism and the motor, means for controlling the pumping mechanism to vary the volume and pressure of fluid delivered, mechanism for connecting the prime mover to said driven mechanism independently of the motor, and means for cutting off the communication between the pumping mechanism and the motor and directing the circulation of fluid through the pumping mechanism while the prime mover is directly connected to the driven mechanism.

16. The combination with a prime mover, of pumping mechanism, a fluid motor, means for conveying fluid from the pumping mechanism to the motor to operate the latter, means to rearrange the pumping mechanism to secure a variation in the speed of the motor, driven mechanism, a clutch between said mechanism and the motor, a clutch between said mechanism and the prime mover, and a single device manually operable to cut off the flow of fluid between the pumping mechanism and the motor, disconnect the clutch betwen the motor and the driven mechanism and connect the clutch between the prime mover and the driven mechanism.

17. The combination with a prime mover, of a plurality of pumps connected thereto, a fluid motor, means for conveying fluid from the pumps to the motor, valve mechanism operable to effect a gradual variation from a maximum to a minimum of the fluid pressure transmitted from the pump to the motor, with a corresponding variation in the volume from a minimum to a maximum, driven mechanism, a clutch between the motor and said driven mechanism, a clutch forming a direct connection between the prime mover and said driven mechanism, and a single controlling device to operate said valve mechanism, disconnect the clutch between the motor and driven mechanism, and connect the clutch between the prime mover and said driven mechanism.

In testimony whereof I have signed my name to this specification in the presence of two subscribing witnesses.

CHARLES O. PEARSON.

Witnesses:
ERNEST W. MARSHALL,
ELLA TUCH.